(12) United States Patent
Espinasse et al.

(10) Patent No.: US 9,188,266 B2
(45) Date of Patent: Nov. 17, 2015

(54) PROTECTIVE SLEEVE FOR A FLEXIBLE PIPE

(75) Inventors: Philippe Espinasse, Bihorel (FR); Jean-Michel Gerez, Paris (FR)

(73) Assignee: TECHNIP FRANCE (FR)

( * ) Notice: Subject to any disclaimer, the term of this patent is extended or adjusted under 35 U.S.C. 154(b) by 450 days.

(21) Appl. No.: 13/257,743

(22) PCT Filed: Mar. 22, 2010

(86) PCT No.: PCT/FR2010/050514
§ 371 (c)(1),
(2), (4) Date: Oct. 17, 2011

(87) PCT Pub. No.: WO2010/109124
PCT Pub. Date: Sep. 30, 2010

(65) Prior Publication Data
US 2012/0048415 A1    Mar. 1, 2012

(30) Foreign Application Priority Data

Mar. 24, 2009  (FR) ..................................... 09 01378

(51) Int. Cl.
*F16L 57/00*    (2006.01)
*F16L 1/12*    (2006.01)
(Continued)

(52) U.S. Cl.
CPC ................. *F16L 35/00* (2013.01); *F16L 1/123* (2013.01); *F16L 57/02* (2013.01)

(58) Field of Classification Search
CPC ........... F16L 1/123; F16L 11/18; F16L 35/00; F16L 57/02; E21B 17/017; H02G 3/0475

USPC .......... 138/110, 106, 108, 155; 405/211, 157, 405/168.2, 216; 600/141
See application file for complete search history.

(56) References Cited

U.S. PATENT DOCUMENTS 982,482 A * 1/1911 Donnelly ....................... 138/101
1,677,077 A * 7/1928 Fortune .......................... 285/116
(Continued)

FOREIGN PATENT DOCUMENTS

EP    0226188 A2    6/1987
EP    0859182 A2    8/1998
(Continued)

OTHER PUBLICATIONS

International Search Report dated Jun. 15, 2010, issued in corresponding international application No. PCT/FR2010/050514.

*Primary Examiner* — Patrick F Brinson
*Assistant Examiner* — Matthew Lembo
(74) *Attorney, Agent, or Firm* — Ostrolenk Faber LLP

(57) ABSTRACT

A protective sleeve for being installed around a longitudinal portion of a pipe (72) for transporting hydrocarbons. The sleeve includes a set of rings, each of which has two opposite flanks (16, 18), and which are retained together in series, with the flanks (16, 18) opposite each other, by a plurality of elastically deformable connecting elements (32). The bending of the longitudinal portion is capable of causing contraction of the connecting elements (32) located towards the inside of the curve, as well as the elongation of the opposite connection elements (32), in order to resist the bending. Each connecting element (32) has two opposite rigid attachment portions (34, 36) and an elastic deformable body (38) interposed between the two attachment portions. The attachment portions (34, 36) are attached to the flanks (16, 18) opposite the rings (10), respectively.

9 Claims, 2 Drawing Sheets

(51) Int. Cl.
  *E02D 5/60* (2006.01)
  *E02D 31/00* (2006.01)
  *F16L 35/00* (2006.01)
  *F16L 57/02* (2006.01)

(56) References Cited

U.S. PATENT DOCUMENTS

| | | | | |
|---|---|---|---|---|
| 3,323,552 A * | 6/1967 | Whitehead, Jr. | | 138/120 |
| 3,833,267 A * | 9/1974 | McCumber | | 406/193 |
| 4,396,797 A * | 8/1983 | Sakuragi et al. | | 174/68.3 |
| 4,527,928 A * | 7/1985 | Rutherford et al. | | 405/211 |
| 4,700,693 A * | 10/1987 | Lia et al. | | 600/141 |
| 4,703,135 A * | 10/1987 | Magnani et al. | | 174/135 |
| 4,722,631 A * | 2/1988 | Tagami | | 403/133 |
| 4,790,294 A * | 12/1988 | Allred et al. | | 600/141 |
| 4,796,607 A * | 1/1989 | Allred et al. | | 600/141 |
| 4,976,288 A * | 12/1990 | Steele et al. | | 138/120 |
| 5,005,558 A * | 4/1991 | Aomori | | 600/141 |
| 5,161,828 A * | 11/1992 | Hynes et al. | | 285/2 |
| 5,439,323 A * | 8/1995 | Nance | | 405/195.1 |
| 5,473,723 A * | 12/1995 | Stockman et al. | | 385/134 |
| 5,791,818 A * | 8/1998 | Ng | | 405/211 |
| 5,873,817 A * | 2/1999 | Kokish et al. | | 600/143 |
| 5,909,007 A * | 6/1999 | Nørholmen | | 174/135 |
| 6,095,197 A * | 8/2000 | Kane | | 138/96 R |
| 6,152,185 A * | 11/2000 | Tucker | | 138/110 |
| 6,561,714 B1 * | 5/2003 | Williams et al. | | 403/2 |
| 6,599,496 B2 * | 7/2003 | Carter et al. | | 424/9.1 |
| 6,796,334 B2 * | 9/2004 | Ishikawa et al. | | 138/98 |
| 6,878,149 B2 * | 4/2005 | Gatto | | 606/46 |
| 7,451,784 B2 * | 11/2008 | Goddard | | 138/110 |
| 7,469,722 B2 * | 12/2008 | Berland | | 138/155 |
| 7,568,861 B2 * | 8/2009 | Godoy et al. | | 405/211 |
| 8,353,643 B2 * | 1/2013 | Khachaturian et al. | | 405/196 |
| 2004/0062612 A1 * | 4/2004 | van Belkom et al. | | 405/211 |
| 2006/0225926 A1 * | 10/2006 | Madhavan et al. | | 175/320 |
| 2008/0142106 A1 * | 6/2008 | Berland | | 138/110 |
| 2010/0052316 A1 * | 3/2010 | Smith | | 285/223 |
| 2012/0247598 A1 * | 10/2012 | Bremner | | 138/106 |

FOREIGN PATENT DOCUMENTS

| | | |
|---|---|---|
| GB | 2142788 A | 1/1985 |
| GB | 2316461 A | 2/1998 |
| WO | WO 2006/033579 A1 | 3/2006 |

* cited by examiner

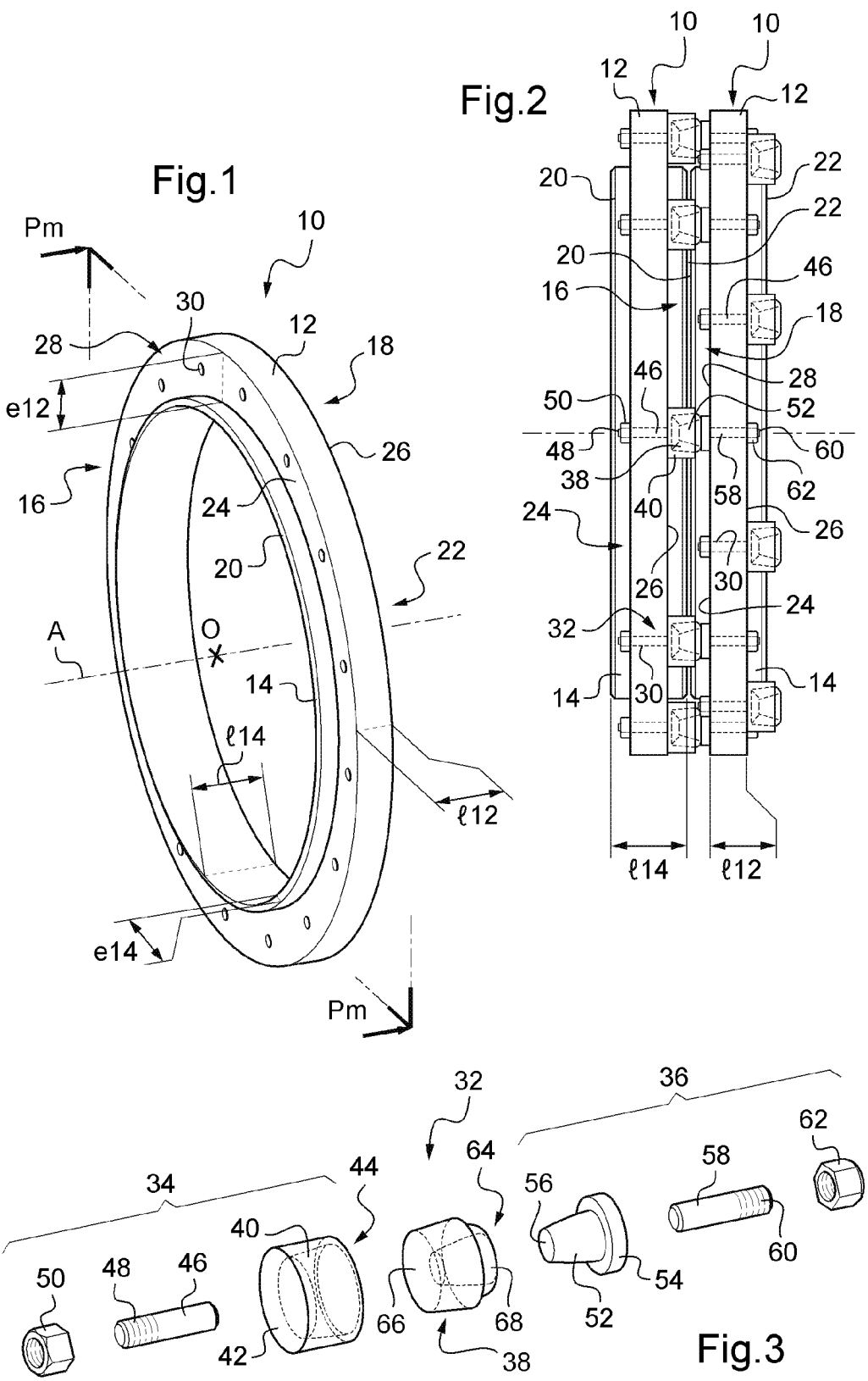

PROTECTIVE SLEEVE FOR A FLEXIBLE PIPE

CROSS-REFERENCE TO RELATED APPLICATIONS

The present application is a 35 U.S.C. §§371 national phase conversion of PCT/FR2010/050514, filed Mar. 22, 2010, which claims priority of French Application No. 0901378, filed Mar. 24, 2009, the contents of which are incorporated by reference herein. The PCT International Application was published in the French language.

BACKGROUND OF THE INVENTION

The present invention relates to protective sleeves intended to preserve the flexible pipes used to transport fluids such as hydrocarbons and in particular gas, between the offshore installations.

Such pipes are said to be non-linked or linked depending on their structures, which comprise wound superposed layers. Precise definitions of these structures can be found in the "recommended practice for flexible pipe" documents published by the American Petroleum Institute (API).

More particularly, the invention relates to a stiffening sleeve intended to be mounted around a longitudinal portion of flexible pipe, usually close to an end of the pipe, to withstand the deflection of said longitudinal portion according to any bend so as to safeguard it from any irreversible damage. The damage may result either from an excessive deflection of the portion of flexible pipe by a small bending radius or else from the repeated deflections, provoked by the movements of the sea swell or currents.

Stiffening sleeves that are known and widely used in the field of flexible oil pipelines consist of a tapered body molded from a plastic material, usually polyurethane. These stiffening sleeves, or "bend stiffeners" are then fitted around the flexible pipe before the end piece is installed. Their weight is relatively high, several hundred kg, for example 900 kg. Also, handling and installing this type of sleeve is fairly difficult. Furthermore, they are made from a single piece of a polymeric material whose cost is relatively high and which requires an appropriate molding technique. Another drawback is the replacement of this type of stiffening sleeve, which cannot be done without cutting the section of flexible pipe bearing it.

To overcome the drawbacks of the above-mentioned stiffening sleeves, consideration has been given to fitting the portion of pipe through a set of collars, which are distributed at regular intervals over the length of the portion of flexible pipe to be reinforced. These collars include axial drill holes intended to receive flexible metallic rods regularly distributed around the pipe.

The document WO2006/033579 discloses such a stiffening sleeve for flexible pipe transporting hydrocarbons. The elastic properties of the metallic rods and their spacings around the circumference of the portion of flexible pipe define the stiffness of the sleeve and consequently the resistance to deflection undergone by the portion of flexible pipe.

However, when the deflection forces exerted on the portion of pipe are too great, the metallic rods buckle and the stiffening sleeve is ultimately bent beyond a bending radius that is acceptable to the pipe, and it is degraded.

Also, a problem which arises and which the present invention seeks to resolve is to provide a protective sleeve which allows not only the deflection of the flexible pipe to be withstood, but more, it makes it possible to prevent the deflection beyond a limiting bending radius.

SUMMARY OF THE INVENTION

In order to resolve this problem, the present invention proposes a protective sleeve which can be fitted around a longitudinal portion of flexible pipe intended for the transportation of hydrocarbons, to withstand the deflection of said longitudinal portion according to any bend. Said sleeve comprises a set of rings each having two opposite sides, the rings of said set being successively held together coaxially with the sides of successive rings respectively facing. The rings are held together by a plurality of elastically deformable axial link elements distributed circularly between the sides of said rings. The deflection of said longitudinal portion can then provoke the contraction of the link elements situated toward the inside of the bend and simultaneously the elongation of the opposite link elements situated toward the outside of the bend to withstand the deflection of said longitudinal portion of flexible pipe. According to the invention, each link element has two opposite rigid fixing parts and a deformable elastic body interposed between said two fixing parts to allow the relative movement of said two fixing parts by generating return forces on said fixing parts. Said fixing parts of each link element are respectively fixed in the facing sides of said rings, so that the deflection of said longitudinal portion of pipe can provoke the compression of said deformable elastic body of the axial link elements inside the bend and the traction of the axial link elements on the outside of the bend to transmit the return forces to said rings.

Thus, an advantageous characteristic of the invention lies in the implementation of link elements in three parts, two rigid fixing parts, situated at the two opposite ends of said link element, and a part consisting of a deformable elastic body, for example made of a polymer material, interposed between said two rigid parts. In this way, when the longitudinal portion deflects, under the effect of the movements of the sea, the rings attached to the pipe are driven to move and the ring portions oriented toward the inside of the bend are brought closer together and thus, the fixing parts of each link element are brought closer together by compressing the elastic body. The latter, by its deformation, opposes a resistance to the compression and induces opposite forces on the fixing parts. At the limit, the compressed elastic body also becomes rigid and contributes to the blocking of the fixing parts toward one another.

Thus, for certain applications, for example when the flexible pipe transports liquefied natural gas, and for which high stresses tending to provoke its deflection are exerted, it is advantageous to provide the pipe with a protective sleeve according to the invention, which makes it possible to limit the bending radius of the portion of flexible pipe on which it is fitted, to a minimum value.

Such a protective sleeve is relatively inexpensive and also lighter than the usual polyurethane tapered stiffening sleeves. It, for example, is comprised of modules comprising a determined number of rings, which can then be joined together, which makes it easier to mount on the pipe and simplifies the replacement of one of its modules by comparison to the solutions of the prior art.

According to one implementation of the invention which is particularly advantageous, said sides of each ring have an internal circular flange situated toward the center of said ring and which extends roughly perpendicularly to said side, and said rings of said set of rings are held close to one another so that the deflection of said longitudinal portion can also provoke the respective coming-into-contact of the internal circular flange portions of said rings situated toward the inside of the bend to block the deflection of said longitudinal portion of pipe. Thus, the coming-into-contact of the portions of internal circular flange allows for the mechanical blocking of the rings toward the inside of the bend and prevents the deflection of the portion of pipe beyond a certain limit and within a limiting bending radius. In this way, by virtue of the protective sleeve that is the subject of the invention, the control of the bending of the portion of pipe fitted inside is twofold. The resistance to the deflection of the protective sleeve and the limiting of its bending already allows, by virtue of the link elements, for the safeguarding of the portion of pipe from an excessive bending and, in addition, the particular shape of the rings allows for their contact and a blocking of the deflection of the sleeve and consequently of the pipe.

Advantageously, the sides of said rings have an outer circular edge situated opposite the center of said ring relative to said internal circular flange, and said fixing parts of each link element are respectively fixed in said outer circular edges. Thus, the internal circular flanges of the consecutive rings are likely to come into contact, whereas the outer circular edges remain spaced apart from one another, leaving a space between rings allowing for the reception of the axial link elements. Preferentially, said rings are respectively formed by and comprise two concentric bushings fixed in one another. One of them, the internal bushing, is axially wider, and it is fitted into the other to be totally attached thereto to form the ring.

Preferably, said link elements consist of silent blocks and said two opposite rigid fixing parts comprise, on the one hand, a receiving bush having a bottom and an opening and, on the other hand, a substantially tapered member adapted to be fitted through said opening so that the point of said tapered member is oriented toward said bottom, whereas said deformable elastic body comprises a hollow cylindrical member which can be fitted inside said bush and receive said tapered member.

Furthermore, this hollow cylindrical member made of PU (polyurethane) is glued inside the bush, whereas the tapered member is glued inside the hollow cylindrical member. The gluing method, steel on PU, is sufficiently strong to withstand a deformation by traction of the hollow cylindrical member, when the bush and the tapered member are separated from one another, without in any way resulting in the separation of the three elements.

According to a preferred implementation of the invention, said receiving bush has a bush rod attached to said bottom and which extends outside of said bush and opposite said opening, said bush rod being intended to be fitted through said rings in an axial direction to fasten said bush to said rings. For example, as will be explained in more detail hereinafter in the description, said bush rod passes through said ring from side to side and its free end is threaded to receive a nut which bears against the side opposite to that which receives the bearing bush. Similarly, said tapered member advantageously has a tapered member rod fastened to said tapered member and which extends opposite said point, said tapered member rod being intended to be fitted through said rings in an axial direction to fasten said tapered member to said rings.

Furthermore, each ring of said set advantageously is comprised of two half-shells assembled by bolting, so as to be able to be replaced without dismantling all of the sleeve.

Other particular features and advantages of the invention will emerge from reading the following description of a particular embodiment of the invention, given as a nonlimiting indication, with reference to the appended drawings in which:

BRIEF DESCRIPTION OF THE DRAWINGS

FIG. 1 is a perspective schematic view of a component element of the protective sleeve according to the invention;

FIG. 2 is a schematic side view of two paired component elements;

FIG. 3 is a perspective schematic view of the means for pairing the two elements represented in FIG. 2;

DESCRIPTION OF PREFERRED EMBODIMENTS

Figure 4:
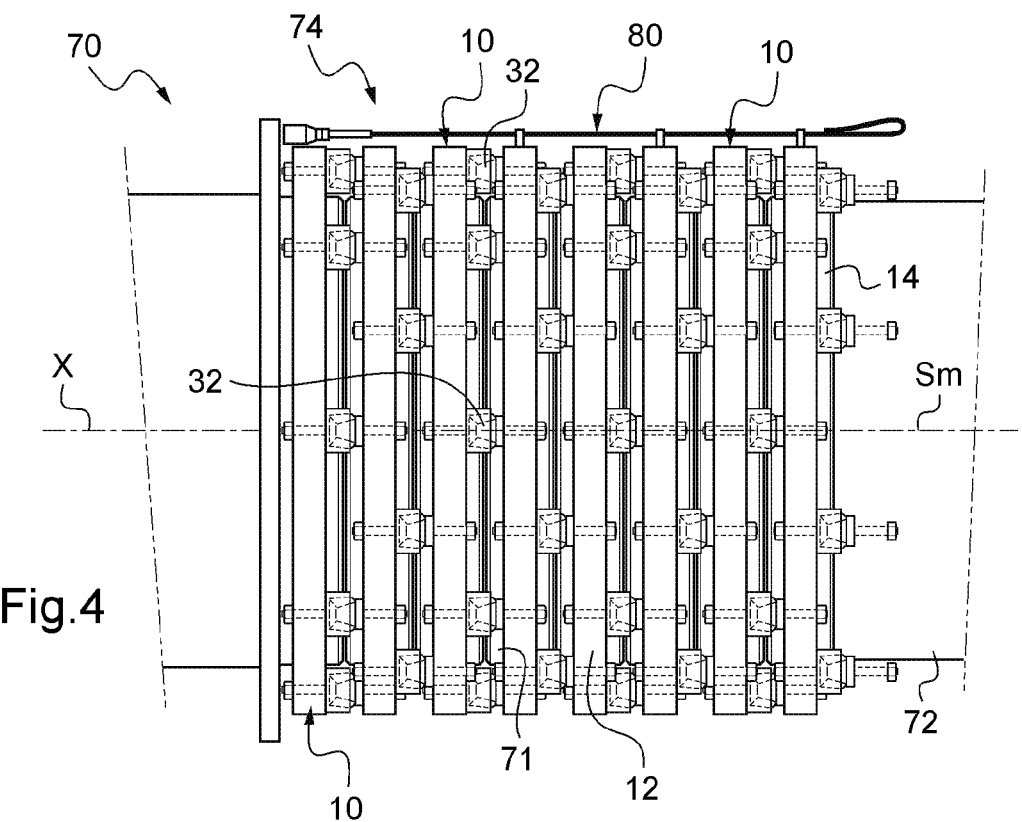
FIG. 4 is a schematic side view illustrating a protective sleeve according to the invention, seen from the side and in a first position.

FIG. 1 illustrates a ring 10 with an axis of symmetry A and center O, forming a single piece and consisting of two concentric bushings, an outer bushing 12 and an inner bushing 14 fitted inside the outer bushing 12. Preferentially, the two concentric bushings are attached by welding. The ring 10 has two opposite sides 16, 18. The inner bushing 14 has a diameter of 0.6 m for example, and an axial width l14 much greater than its radial thickness e14; for example, an axial width l14 of 0.1 m for a radial thickness of 5 mm. The outer bushing 12 has an internal diameter close to the external diameter of the inner bushing 14 so as to be able to receive the latter and grip it. The outer bushing 12 has an axial width_l12 less than the axial width_l14 of the inner bushing 14, for example 0.08 m, so that the inner bushing 14 forms two opposite internal circular flanges 20, 22, symmetrical to one another relative to the median plane Pm defined by the outer bushing 12. Thus, the outer bushing 12 forms two opposite shoulders 24, 26 respectively having a circular edge 28. Furthermore, the outer bushing 12 has a radial thickness e12, close to its axial width_l14. In this circular edge 28, axial drill holes 30 are formed, passing from side to side through the outer bushing 12. In FIG. 1, there are sixteen of these axial drill holes 30 and they are evenly distributed in the circular edge 28. Thus, in the example illustrated here, the axial drill holes 30 are spaced apart by a distance close to 0.134 m.

The protective sleeve according to the invention consists of a set of rings 10 of the type illustrated in FIG. 1. The rings 10 then are successively held together and coaxially, the sides respectively facing, by a plurality of elastically deformable axial link elements consisting of silent blocks. As an illustration, FIG. 2 shows two rings 10 held coaxially by link elements 32 formed by silent blocks that will first be described in detail with reference to FIG. 3.

These link elements 32 have two opposite rigid fixing parts 34, 36 and a deformable elastic body 38 intended to be interposed between the two fixing parts 34, 36. One of the rigid fixing parts 34 includes a receiving bush 40 having a bottom 42 and, opposite, an opening 44. Furthermore, the receiving bush 40 is provided with a bush rod 46 intended to be attached axially to the bottom 42 and opposite the opening 44. The bush rod 46 has a length substantially greater than the axial width l12_ of the outer bushing 12 and, in addition, its free end 48 is threaded so as to be able to receive a nut 50. In this way, it can be fitted inside the axial drill holes 30 so as to attach the receiving bush 40 and the outer bushing 12.

The other rigid part 36 includes a tapered member 52 having, at the base, a collar 54 and, opposite, a point-forming part 56. The tapered member 52 is also provided with a tapered member rod 58 mounted coaxially attached in the base at the level of the collar 54. The tapered member rod 58 extends opposite the point-forming part 56 and its free end 60 is also threaded to receive a second nut 62. The tapered member rod 58 also has a length substantially greater than the axial width l12 of the outer bushing 12 and it is adapted to be fitted inside the axial drill holes 30 to attach the tapered member 52 to the outer bushing 12.

Furthermore, the deformable elastic body 38 consists of a hollow cylindrical member made of polymeric material of elastomer type, for example of polyurethane. The hollow cylindrical member of the deformable elastic body 38 has an inlet opening 64 and an opposite bottom wall 66 sealing it. The inlet opening 64 is extended by a substantially tapered space 68, the base of this space being oriented toward the inlet opening 64, whereas the point of this space is oriented toward the bottom wall 66. The substantially tapered space 68 has dimensions close to those of the tapered member 52 so as to be able to receive it.

Reference will once again be made to FIG. 2 to describe the way the rings 10 are paired. The two rings represented in FIG. 2 are paired by means of eight link elements 32 of the type illustrated in FIG. 3. This Figure shows five link elements only, the other three being situated at the back of the Figure. Furthermore, the two rings 10 are coaxially fitted and their sides 18, 16 facing one another, whereas their sixteen respective axial drill holes 30 are situated opposite one another. The link elements 32 comprising their two rigid fixing parts 34, 36 and their deformable elastic body 38 are, on the other hand, fitted step by step every two pairs of axial drill holes 30. Thus, a link element 32 can be found, for example, in the center of the Figure. The bush rod 46 is then engaged in an axial drill hole 30, whereas the tapered member rod 58 is engaged in the facing axial drill hole 30. The nuts 50, 62 are respectively screwed onto the respective free ends 48, 60 of the rods in order, on the one hand, to secure the bush 40 bearing against the circular edge 28 of one of the rings 10, and, on the other hand, to secure the corresponding tapered member 52 bearing against the circular edge 28 of the other ring 10. Also, the tapered member 52 is engaged inside the tapered space 68 of the deformable elastic body 38. The other seven link elements 32 are adjusted in the same way to ultimately hold together the two rings 10. In balance, when the deformable elastic body 38 of each link element 32 is at rest and is neither compressed nor stretched, the two facing flanges 20, 22 of the inner bushings 14 are axially spaced apart from one another by a determined distance of the order of a millimeter, for example 4 mm.

It will be observed that the other eight axial drill holes 30 are intended to receive, for the ring 10 situated on the right in FIG. 2, the bush rod 46 of a second series of link elements 32 to link it to a third ring which is not represented.

Figure 5:
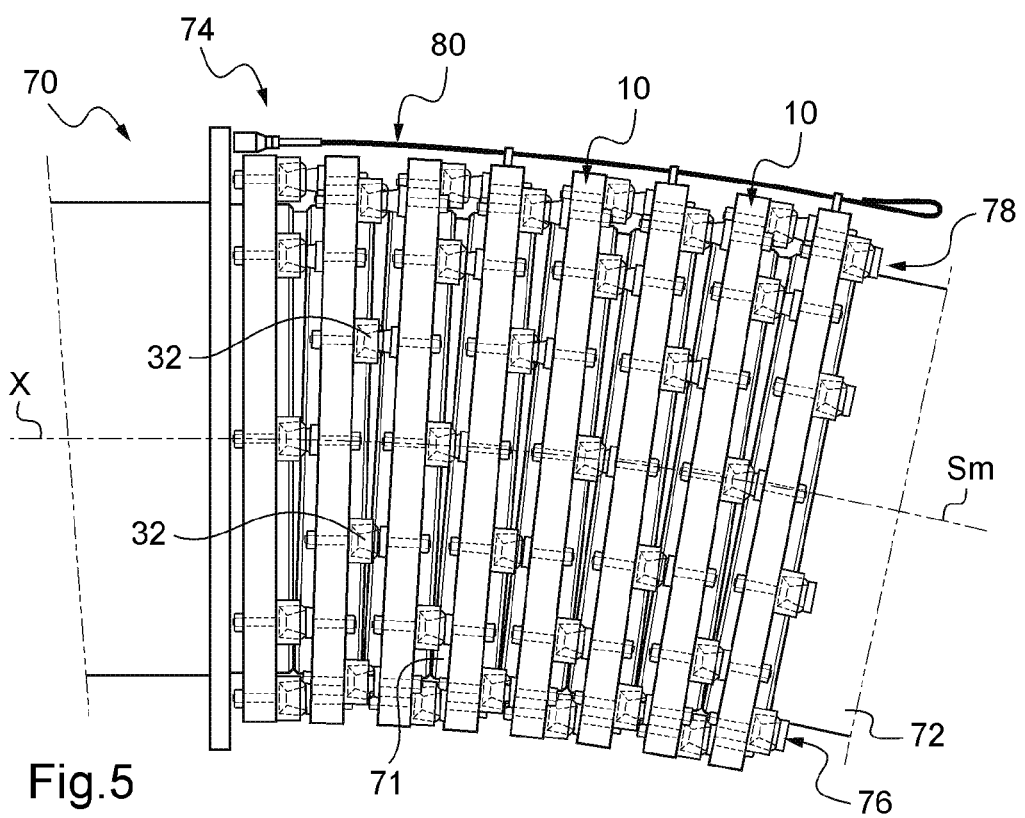
FIG. 5 is a schematic side view of the protective sleeve as illustrated in FIG. 4 in a second position.

Reference will now be made to FIGS. 4 and 5, illustrating an end 70 of a flexible tubular pipe 72 with an axis of symmetry X. The end 70 is then fitted with a protective sleeve 74 according to the invention in this case comprising a set of eight successive rings linked together in a manner as illustrated in FIG. 2. Thus, in this position, the rings 10 are coaxially fitted around a portion 71 of the flexible pipe 72. All the rings 10 are paired two by two by means of eight link elements 32 and thus, the link elements 32 are fitted in staggered formation relative to the cylindrical surface defined by the outer bushings 12.

When the flexible tubular pipe 72 is longitudinally extended along the axis X, the protective sleeve 74 is in balance, and the deformable elastic bodies 38 of each of the link elements 32 are neither compressed nor stretched.

When the flexible tubular pipe 72 is deflected, as illustrated in FIG. 5, the end 70 remaining in the fixed position, the inner portions 76 of rings 10 situated toward the inside of the bend tend to move axially closer to one another, whereas the outer portions 78 of rings 10 situated toward the outside of the bend are moved apart from one another. The deflection of the pipe portion 71 here takes place in a vertical plane, so that the axis of symmetry X of the flexible tubular pipe 72 tends also to bend in this vertical plane. The axis of symmetry X is then contained in a median surface Sm which is bent and perpendicular to the vertical plane. Like a neutral fiber of a deformable beam, all the link elements 32 situated at the level of the median surface Sm remain substantially at rest, whereas all the link elements 32 situated toward the inside of the bend below the median surface Sm tend to contract, and the link elements 32 situated opposite relative to the median surface Sm tend, on the other hand, to elongate. In such a position of the rings, it will be considered that they are always held together coaxially, even if the axis of symmetry X is bent.

Thus, for the link elements 32 situated toward the inside of the bend, their tapered member 72 tends to compress the deformable elastic body 38 inside the receiving bush 40 by allowing an axial movement of the rings 10 relative to one another. On the other hand, because of this contraction, the deformable elastic body 38 generates a reaction force which tends, on the contrary, to move the rings 10 away from one another. It is this which provides a resistance to the deflection of the pipe portion 71. On the other hand, toward the outside of the bend, above the median surface Sm, the tapered member 72 of the link elements 32 tends to move out of the receiving bush 40 and to stretch the deformable elastic body 38 which, conversely, also offers a traction-resisting force.

Thus, by virtue of these antagonistic forces, toward the inside of the bend which tend to move the rings 10 apart from one another and toward the outside which tends to bring them closer together, the protective sleeve 74 makes it possible to provide pipe portion 71 with deflection resistance.

Another advantage of the invention lies in the coming-into-contact of the flanges 20, 22 of the successive rings 10 toward the inside of the bend, when the latter becomes too great and that the link elements 32 are no longer sufficient to control this bend. Thus, the flanges 20, 22, at the level of the inner portions 76 of rings 10 successively abut against one another and then block the deflection of the portion 71 of flexible pipe 72 fitted into the protective sleeve 74. Thus, the protective sleeve according to the invention offers all the functions of a stiffener and, in addition, that of a bend limiter beyond which the portion pipe that it surrounds can not be deflected.

Moreover, the protective sleeve according to the invention is in no way limited to eight rings. It is thus designed to form protective sleeves including many more rings so as to limit the bending of longer pipe portions. Nor is the number of link elements 32 for pairing two rings limiting either. Provision can be made, for example, for pairing the rings two by two by means of ten link elements. As for the diameter of the protective sleeve, it is obviously adapted to the outer diameter of the flexible pipe to be safeguarded. Consequently, smaller ring diameters are provided, for example of 0.4 m.

In addition, a cable 80 extends in the axial direction along the protective sleeve. A first end of the cable is fixed to the end of the flexible pipe, while other attachment points are also distributed along the protective sleeve. FIG. 4, for example, shows fixing points every 3 rings. When handling the protective sleeve or installing the flexible pipe provided with the protective sleeve, this cable makes it possible to prevent any excessive elongation from occurring and damaging the rings of the protective sleeve. Thus, the handling of the protective sleeve is more secure.

Furthermore, rings are provided that consist of two adjustable half-rings, held together by bolting, in order to be able to more easily replace the damaged rings of the set of rings forming the protective sleeve.

The embodiment described is in no way limiting on the invention. In particular, it could be advantageous to provide a protective sleeve with a different distribution of stiffness distributed along the sleeve. This can easily be done by adapting the spacing between the rings of the protection assembly. For this, it is sufficient simply to provide link elements with elastically deformable elements of different lengths. As an example, deformable elements with short lengths could be fitted on the rings closest to the end. Then, the link elements with elastic bodies with longer lengths could be placed on the rings further away from the end.

The invention claimed is:

1. A protective sleeve for fitting around a longitudinal portion of a flexible pipe configured to transport hydrocarbons, the protective sleeve configured to withstand deflection of said longitudinal portion causing a bend, said sleeve comprising:
    a set of rings, each ring having two opposite sides, said rings of said set being successively held together coaxially such that successive sides of successive said rings face each other;
    said sides respectively facing neighboring said sides of successive said rings;
    neighboring rings of said set of rings being held together by a plurality of elastically deformable axial link elements distributed circularly between said facing sides of said neighboring rings,
    wherein the deflection of said longitudinal portion causes contraction, along an axis of said pipe, of said link elements situated toward an inside of the bend and simultaneously causes elongation of opposite said link elements situated toward an outside of the bend to withstand deflection of said longitudinal portion of flexible pipe;
    each said link element comprising two opposite rigid fixing parts and a deformable elastic body interposed between said two fixing parts, said elastic body configured to allow relative movement of said two fixing parts by generating return forces on said fixing parts;
    said fixing parts of each said link element are respectively fixed in said facing sides of said rings, so that the deflection of said longitudinal portion of said pipe provokes compression of said deformable elastic body inside the bend and traction of said axial link elements on the outside of the bend transmits the return forces to said rings.

2. The protective sleeve as claimed in claim 1, wherein said deformable elastic body is comprised of polymer material.

3. The protective sleeve as claimed in claim 1, wherein said sides of each said ring comprises a radially internal circular flange situated toward a center of said ring, and
    said neighboring rings are held close to one another so that deflection of said longitudinal portion also provokes respective coming-into-contact of said internal circular flange portions of said rings situated toward the inside of the bend to block the deflection of said longitudinal portion of pipe.

4. The protective sleeve as claimed in claim 3, wherein said sides of said rings also have a radially outer circular edge situated opposite the center of said ring relative to said internal circular flange, and
    said fixing parts of each said link element are respectively fixed in said outer circular edges.

5. The protective sleeve as claimed in claim 3, wherein each ring comprises two concentric bushings fixed to one another.

6. The protective sleeve as claimed in claim 1, wherein a first of said two opposite rigid fixing parts comprises a receiving bush having a bottom and an opening, and
    a second of the two opposite rigid fixing parts comprises a substantially tapered member fitted through said opening so that a point of said tapered member is oriented toward said bottom; and
    said deformable elastic body comprises a hollow cylindrical member configured to fit inside said bush and receive said tapered member.

7. The protective sleeve as claimed in claim 6, further comprising:
    a bush rod fastened to said bottom of said receiving bush and which extends outside of said bush and opposite said opening,
    said bush rod being fitted through said rings in an axial direction to fasten said bush to said rings.

8. The protective sleeve as claimed in claim 6, wherein said tapered member comprises:
    a tapered member rod which is fastened to said tapered member and which extends opposite said point of said tapered member,
    said tapered member rod being fitted through said rings in an axial direction to fasten said tapered member to said rings.

9. The protective sleeve as claimed in claim 1, wherein each said ring of said set comprises two half-shells assembled by bolting.

\* \* \* \* \*